(12) United States Patent
Kruglick

(10) Patent No.: US 10,252,167 B2
(45) Date of Patent: *Apr. 9, 2019

(54) LOCATION GRAPH ADAPTED VIDEO GAMES

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,517

(22) Filed: Apr. 24, 2017

(65) Prior Publication Data
US 2017/0259176 A1   Sep. 14, 2017

Related U.S. Application Data

(63) Continuation of application No. 14/353,238, filed as application No. PCT/US2013/061175 on Sep. 23, 2013, now Pat. No. 9,630,110.

(51) Int. Cl.
| | | |
|---|---|---|
| *A63F 13/65* | (2014.01) | |
| *A63F 13/216* | (2014.01) | |
| *G06T 19/00* | (2011.01) | |

(52) U.S. Cl.
CPC .......... *A63F 13/65* (2014.09); *A63F 13/216* (2014.09); *G06T 19/003* (2013.01); *G06T 19/006* (2013.01)

(58) Field of Classification Search
CPC ...... A63F 13/65; A63F 13/216; G06T 19/003; G06T 19/006

USPC ........................................................... 463/31
See application file for complete search history.

(56) References Cited

U.S. PATENT DOCUMENTS

| | | |
|---|---|---|
| 8,277,315 B2 | 10/2012 | Burak et al. |
| 2002/0093541 A1 | 7/2002 | Schileru-Key |
| 2010/0083169 A1 | 4/2010 | Athsani et al. |
| 2012/0028706 A1 | 2/2012 | Raitt et al. |
| 2012/0095945 A1 | 4/2012 | Jones et al. |
| 2012/0194516 A1 | 8/2012 | Newcombe et al. |
| 2012/0218296 A1 | 8/2012 | Belimpasakis et al. |

(Continued)

FOREIGN PATENT DOCUMENTS

| | | |
|---|---|---|
| CN | 1843539 | 10/2006 |
| CN | 1866264 | 11/2006 |

(Continued)

OTHER PUBLICATIONS

"University Enhances Visual Identification Technologies for Retail Applications," University of Arkansas, accessed at https://cacm.acm.org/careers/162656-university-enhances-visual-identification-technologies-for-retail-applications/fulltext, Mar. 28, 2013, pp. 2.

(Continued)

*Primary Examiner* — David L Lewis
*Assistant Examiner* — Shauna-Kay N Hall

(57) ABSTRACT

Technologies related to location graph adapted video games are generally described. In some examples, location graphs may be generated for received environment inputs, such as received three dimensional (3D) models of environments. Video games may be adapted to generated location graphs, such as by placing video game content at nodes of location graphs. Video game and/or user parameters may be accommodated when adapting video games to location graphs.

25 Claims, 7 Drawing Sheets

(56) References Cited

U.S. PATENT DOCUMENTS

| | | |
|---|---|---|
| 2012/0264518 A1 | 10/2012 | Rouille |
| 2013/0065692 A1 | 3/2013 | Aronzon et al. |
| 2015/0231503 A1 | 8/2015 | Kruglick |

FOREIGN PATENT DOCUMENTS

| | | |
|---|---|---|
| CN | 101721811 | 6/2010 |
| CN | 102656542 A | 9/2012 |
| WO | 2012173602 A1 | 12/2012 |
| WO | 2013013281 A1 | 1/2013 |

OTHER PUBLICATIONS

Cohen, J., "Graph Twiddling in a MapReduce World," Computing in Science & Engineering, vol. 11, Issue 4, pp. 29-41 (Jul.-Aug. 2009).

Cordella, L.P., et al., "An Improved Algorithm for Matching Large Graphs," In 3rd IAPR-TC15 Workshop on Graph-based Representations in Pattern Recognition, pp. 149-159 (May 23-25, 2001).

Dorrier, J., "Free 123D Catch App Makes Your iPhone a 3D Scanner," accessed at https://web.archive.org/web/20130908112323/http://singularityhub.com/2012/09/15/free-123d-catch-app-makes-your-iphone-a-3d-scanner/, Sep. 15, 2012, pp. 12.

Holloway, J., "Mallerport scans 3D objects and spaces "20 times faster" than competitors," accessed at https://web.archive.org/web/20130901180153/http://www.gizmag.com/matterport-3d-scanner/22118/, Apr. 11, 2012, pp. 9.

"Wii U Official Site," Nintendo, accessed at https://web.archive.org/web/20130921083625/http://www.nintendo.com/wiiu, accessed on Apr. 21, 2017, archived on Sep. 21, 2013, pp. 2.

International Search Report and Written Opinion for International Application No. PCT/US2013/061175 dated Feb. 21, 2014, pp. 7.

Khan, A.M., et al., "A Triaxial Accelerometer-Based Physical-Activity Recognition via Augmented-Signal Features and a Hierarchical Recognizer," IEEE Transactions on Information Technology in Biomedicine, vol. 14, No. 5, pp. 1166-1172 (Sep. 2010).

Kukluk, J.P., et al., "Algorithm and Experiments in Testing Planar Graphs for Isomorphism," Journal of Graph Algorithms and Applications, vol. 8, No. 3, pp. 313-356 (2004).

Lopes R., and Bidarra, R., "Adaptivity Challenges in Games and Simulations: A Survey," IEEE Transactions on Computational Intelligence and Ai in Games, vol. 3, No. 2, pp. 85-99 (Jun. 2011).

Mackaness, W.A., and Beard, M.K., "Use of Graph Theory to Support Generalisation," Cartography and Geographic Information Systems, vol. 20, Issue 4, pp. 210-221 (Sep. 1993).

Makerblock., "Set iPhone to Scan!," accessed at https://web.archive.org/web/20150906004508/http://www.makerbot.com/blog/2011/04/12/set-iphone-to-scan, Apr. 12, 2011, pp. 5.

Minnen, D., et al., "Recognizing and Discovering Human Actions From On-Body Sensor Data," IEEE International Conference on Multimedia and Expo, pp. 1545-1548 (Jul. 6, 2005).

Plafke, J., "Sources say PlayStation 4 will have smartphone and tablet controls, release date in November," accessed at http://web.archive.org/web/20130426101100/http://www.geek.com/games/sources-say-playstation-4-will-have-smartphone-and-tablet-controls-release-date-in-november-1540347, Feb. 20, 2013, pp. 2.

Reid, J., et al., "Magic Moments in situated mediascapes" Proceedings of the 2005 ACM SIGCHI International Conference on Advances in computer entertainment technology, pp. 290-293 (Jun. 15-17, 2005).

Reid, J., "Design for coincidence: Incorporating real world artifacts in location based games," Proceedings of the 3rd international conference on Digital Interactive Media in Entertainment and Arts, pp. 18-25 (Sep. 10-12, 2008).

Roden, T., and Parberry, I., "From Artistry to Automation: A Structured Methodology for Procedural Content Creation," Entertainment Computing, vol. 3166, pp. 151-156 (2004).

Zivkovic, Z., et al., "Hierarchical Map Building and Planning based on Graph Partitioning," Proceedings 2006 IEEE International Conference on Robotics and Automation, pp. 803-809 (May 15-19, 2006).

LOCATION GRAPH ADAPTED VIDEO GAMES

CROSS-REFERENCE TO RELATED APPLICATIONS

The present application is a continuation application under 35 U.S.C. § 120 of U.S. application Ser. No. 14/353,238, filed on Apr. 21, 2014, now U.S. Pat. No. 9,630,110, which is a U.S. National Stage filing under 35 U.S.C. § 371 of International Application No. PCT/US2013/061175, filed on Sep. 23, 2013, entitled "LOCATION GRAPH ADAPTED VIDEO GAMES." International Application No. PCT/US2013/061175 and U.S. application Ser. No. 14/353,238, including any appendices or attachments thereof, are hereby incorporated by reference in their entirety.

BACKGROUND

Unless otherwise indicated herein, the materials described in this section are not prior art to the claims in this application and are not admitted to be prior art by inclusion in this section.

Video games can add interest by providing scenes from real-world places, such as racing games that use real-world road maps and scenery. Such games may for example allow user selection from static lists of environments that are developed for games. Currently available technologies generally require extensive development effort for each real-world environment made available within a game.

SUMMARY

The present disclosure generally describes technologies including devices, methods, and computer readable media relating to location graph adapted video games. Some example methods may comprise methods for adapting video games to received environment inputs. Example environment inputs include multidimensional environment information, such as three dimensional (3D) models of environments, environment scans comprising images adapted for constructing 3D models of environments, data corresponding to rooms in a building and doorways between rooms, or for example location trace data or motion data, showing locations and/or motions of a moving object, such as a person, as the person moves through an environment.

Example methods for adapting video games to received environment inputs may include: receiving an environment input comprising multidimensional environment information; generating a location graph representing the received environment input; and adapting a video game to the location graph representing the received environment input. Example location graphs may comprise nodes corresponding to locations within the received environment input, and connections between the nodes corresponding to pathways between the locations.

In some embodiments, adapting video games to location graphs may comprise generating procedural video game content using a library of video game content and a generated location graph, e.g., by placing video game content from the library at the nodes of the location graph. For example, when an environment input includes a 3D model, adapting a video game to a location graph may comprise generating procedural video game content by placing video game content from the library at the nodes and/or edges of the location graph within the 3D model.

In some embodiments, adapting video games to location graphs may comprise matching a location graph with a preexisting video game location graph. For example, when an environment input includes a 3D model, adapting a video game to a location graph may comprise generating a location graph for the 3D model, matching the generated location graph with a preexisting video game location graph, and combining the 3D model with video game content corresponding to the matching preexisting video game location graph.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server, a game console, or other computing device comprising a processor, a memory, and a video game adaptation system configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
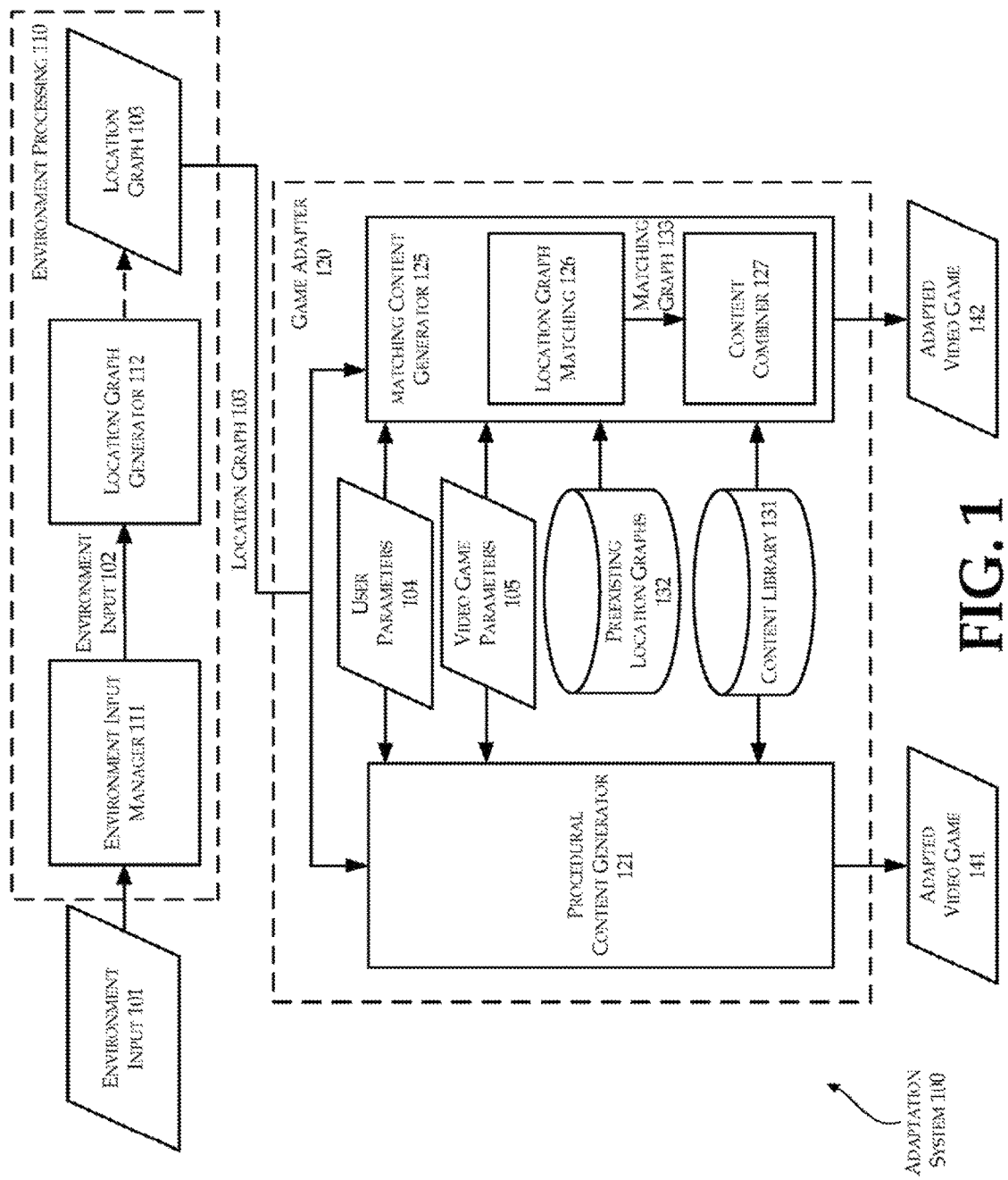
FIG. 1 is a diagram illustrating an example video game adaptation system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to location graph adapted video games. In some examples, location graphs may be generated for received environment inputs, such as received 3D models of environments. Video games may be adapted to generated location graphs, such as by placing video game content at nodes of location graphs. Video game and/or user parameters may be accommodated when adapting video games to location graphs.

In some example scenarios, video games may be adapted to environments such as user homes, offices, or workplaces. Adapted video games may provide a traditional gaming experience in which users, for example, gamers or video game players sit or stand in front of a display, such as a television, and play the adapted game. Alternatively, adapted video games may provide an augmented reality or "AR" gaming experience in which users move around their environments, carrying a mobile device, and the video game inserts adapted video game content into live video received through the mobile device's camera and displayed by the mobile device or into the user's line of sight through projection, etc. This description uses the traditional gaming experience as an example, with additional considerations provided for AR video games as appropriate.

Example methods for adapting video games to received environment inputs may include receiving an environment input comprising multidimensional environment information. In some embodiments, multidimensional environment information may comprise two-dimensional (2D) environment information, such as a 2D map showing rooms, walls, and doors of a house or other structure. In some embodiments, multidimensional environment information may comprise three-dimensional (3D) environment information such as a 3D model showing rooms, walls, and doors of a house or other structure.

Example methods for adapting video games to received environment inputs may include generating a location graph representing the received environment input. Example location graphs may comprise nodes corresponding to locations within the received environment input, such as nodes that represent various rooms or portions of rooms of the house or other structure, and connections between the nodes corresponding to pathways between the locations, such as connections between nodes corresponding to doorways between the various rooms.

Example methods for adapting video games to received environment inputs may include adapting video games to generated location graphs. Two example approaches for adapting video games to location graphs are described in detail herein, and persons of skill may combine the disclosed approaches and/or create new approaches with the benefit of this disclosure.

A first example approach for adapting video games to received environment inputs may comprise generating procedural video game content using a library of video game content and a generated location graph, e.g., by placing video game content from the library at the nodes of the location graph. Video game content may be randomly placed at the nodes of the location graph, or optionally according to any video game, procedural, and/or user parameters.

For example, video game parameters may designate encounters with opponents of increasing opponent strength or increasing encounter difficulty. Embodiments may be adapted to select a first node within the generated location graph for placement of video game content for a first opponent. The first opponent, having a lowest level of opponent strength, may be placed at the first node in the location graph. A second node may be selected in the location graph, wherein the second node may be, e.g., connected to the first node. A second opponent having a next level of opponent strength may be placed at the second node. A third node may be selected in the location graph, wherein the third node may be, e.g., connected to the second node but not the first node. A third opponent having a highest level of opponent strength may be placed at the third node. Additional examples may account for a variety of different potential location graph properties as well as different types of video games having a wide variety of possible parameters.

User parameters may comprise, for example: out of bounds parameters marking locations within an environment input as unavailable for use in the video game; time of use parameters marking locations within the environment input as available or unavailable for use in the video game during specified times; and/or content type parameters designating allowed or disallowed video game content types within locations within the environment input, e.g., "nothing spooky in the bedroom". Embodiments may be adapted to apply such example user parameters when placing video game content at nodes in a generated location graph.

A second example approach for adapting video games to received environment inputs may comprise matching a location graph with a preexisting video game location graph. For example, a video game may comprise a variety of different space stations, each space station having crew member characters that may be encountered in various different rooms. Embodiments may be adapted to compare a generated location graph with preexisting video game location graphs for each of the different space stations, to find a matching or best matching preexisting video game location graph. Video game content for a matching space station and crew member characters may then be, for example, combined with the generated location graph, to place video game content such as space station controls and crew member characters into an environment such as the user's house, office, or workplace. Like procedural content generation approaches, location graph matching approaches may accommodate video game and/or user parameters.

FIG. 1 is a diagram illustrating an example video game adaptation system 100, arranged in accordance with at least some embodiments of the present disclosure. As depicted, adaptation system 100 may be configured to receive an environment input 101, generate a location graph 103 representing environment input 101, and adapt a video game to location graph 103 to produce an adapted video game such as, e.g., an adapted video game 141 or an adapted video game 142.

In some embodiments, adaptation system 100 may include an environment processing subsystem 110 and a game adapter subsystem 120. Environment processing subsystem 110 may be configured to receive environment input

101 and generate location graph 103. Example components of environment processing subsystem 110 include an environment input manager 111 and a location graph generator 112. Environment input manager 111 may be configured to construct a modified environment input 102 from received environment input 101, wherein modified environment input 102 is in a form that can be processed by location graph generator 112 and/or game adapter subsystem 120. Location graph generator 112 may be configured to generate location graph 103 from modified environment input 102 and/or from received environment input 101, wherein location graph 103 comprises nodes corresponding to locations within received environment input 101 and/or modified environment input 102, and wherein location graph 103 comprises connections between the nodes corresponding to pathways between the locations within received environment input 101 and/or modified environment input 102.

Game adapter subsystem 120 may be configured to adapt a video game to location graph 103, e.g., by using location graph 103 to produce adapted video game 141 or 142. Example components of game adapter subsystem 120 include either or both of a procedural content generator 121 or a matching content generator 125. Procedural content generator 121 may be configured to use a content library 131 and location graph 103, optionally along with user parameters 104 and/or video game parameters 105, to produce adapted video game 141.

Matching content generator 125 may be configured to use content library 131 and location graph 103, optionally along with user parameters 104 and/or video game parameters 105, as well as preexisting location graphs 132, to produce adapted video game 142. Matching content generator 125 may comprise a location graph matching module 126 and a content combiner 127. Location graph matching module 126 may be configured to match location graph 103 with one or more preexisting location graphs in preexisting location graphs 132, and to identify a matching graph 133 (from preexisting location graphs 132) to content combiner 127. Content combiner 127 may be configured to combine video game content associated with matching graph 133, which video game content may be retrieved from content library 131, with received images or other information from environment input 101 or 102, to produce adapted video game 142.

In some embodiments, adaptation system 100 may allow video game users to enjoy playing games placed in their own homes and workplaces. Home games may comprise entertainment games such as suspenseful or fantasy games, and workplace games may comprise serious games used for management training or safety, which may be beneficially adapted to involve the user's actual workplace. Adaptation system 100 may be adapted to generate traditional and/or AR video games placed in users' homes and workplaces. AR video games may be adapted to use, e.g., the remote screen on products such as the Wii U, made by NINTENDO®, smart phone and tablet interactions with products such as the Playstation 4, made by SONY®, head mounted displays somewhere such as GOOGLE GLASS® or the OCULUS RIFT®, or other smart phone or mobile device games that involve the user moving around their environment. AR video games may for example send players on missions that involve their environment as well as optionally other local environments.

In some embodiments, adaptation system 100 may adapt video games to the different room and environment configurations included in different users' homes or offices, while reducing or eliminating the need for manual content development for each location. Adaptation system 100 may for example accept user submitted 3D environment inputs, and automatically generate or match video game content for the received environment inputs so that users can experience games in familiar environments. Adaptation system 100 may use graph isomorphism to map user environments to video game content in order to determine relative game location and user environment location placement. Adaptation system 100 may thereby provide, inter alia, large scale customization of content, higher user engagement, workplace matched serious games, user generated content sharing, and social involvement.

In some embodiments, adaptation system 100 may be configured to generate a graph network, also referred to herein as a location graph, of a scanned environment or other environment input, and to either use that location graph to generate graph-driven procedural content, or to adapt previously developed content that has an associated location graph appropriately with the new environment.

In some embodiments, adaptation system 100 may first receive an environment input comprising a model of an environment, or may generate the model from the received environment input, and may generate a location graph. Locations such as rooms may be recognized as nodes, and connections such as doors may be detected as geometric constrictions. Front door/facility entrances may be user indicated or detected as outer surface doors. Windows may optionally also be detected as potential entrances/exits, which may be a game developer preference based on whether the developer has code providing for characters entering/exiting through windows. Some rooms may be indicated as comprising multiple nodes, which can be algorithmically adjusted based on game developer settings. For example a game involving miniature characters roaming a house may consider any moderate physical space as a separate node, even under a table. A larger scale adventure game may use doors as area delineation and may algorithmically look for ceiling features and frames or other geometric definitions to indicate doors as area separators.

In some embodiments, adaptation system 100 may be configured to detect spaces in 3D models using algorithms such as simultaneous localization and mapping (SLAM) algorithms or map generators. Some games may wish to allow for location graph personalization through user parameters, such as time of day availability and/or the ability to define rules for using content in specific places (e.g., "nothing spooky where I sleep"), as well as considerations such as participant and object height (which may alter player visibility by other players or opponents, and may alter "cover" provided by objects such as large furniture). Location graphs can be generated using algorithms such as cellular automata to geometrically fill spaces, and algorithms such as floor space measurements or accessibility evaluations can be used to generate nodes.

There are a variety of interesting use cases for the technologies described herein. Some embodiments may use AR or location-augmented game elements to send players actually walking around the user environment to accomplish the game. For example an adventure/puzzle game may add virtual fantastic gadgets to rooms of the user's home so that one room becomes the "map room" and another the "enchanting room" or "armory" and the user goes to those rooms to interact with the game elements. Systems using this approach may provide features such as a menu option for a user to declare a room inaccessible if they go to the room and find another family member using it.

In another example use case, multiplayer games may allow each player to declare which room is theirs and customize it to the functions of their character. Thus the wizard may return to their room to use the enchanting crafting functions while the sea captain character goes out on the deck to navigate the ship. Such games furthermore present opportunities to sell game paraphernalia like toy wands, books, and the like and such toys may include AR key patterns so that they become active in the game. One can imagine sending a wizard to their room for enchanting and applying virtual decorations and devices while projecting spell-book images over game-related books purchased by the player. Because adapted games may include the user's home environment, such purchases can be optional extensions of user interactions with physical and augmented objects in the home.

In another example use case, serious workplace games may for example walk new employees through an environment to familiarize them with it. If images in an environment input are detailed enough for extraction of emergency exit signs, a game may include guiding an employee along evacuation paths as part of the game and can work this into pre-existing or procedural content, allowing workplaces to add AR training without the expense of custom content generation. Software for training on worker interaction or management may similarly be automatically fit to a workplace topology so that existing conference rooms and spaces are used. Another workplace training game may include familiarizing a worker with a warehouse layout by giving them tasks that involve going to specific places to scan codes, and again may be automatically matched to an environment scan using the solutions presented herein. Adapted video games may also provide employers with AR placards to indicate where to provide certain pre-canned training modules, for example.

In another example use case, the user's environment may be incorporated into the virtual world of a traditional gaming experience. A stationary player maneuvering a character in a conventional first-person viewpoint game may encounter his own home as a game location, evoking various emotions and connection. If the user's home is presented as the scene of a terrifying event, horror fans may enjoy the deeper and longer lasting impact as they walk around their home later. Some adapted video games may use the player's home as a base of operations for the character, perhaps adding imaginary armories behind secret panels in walls or trap doors under rugs to add interest.

Furthermore, in adapting video games that provide a traditional gaming experience, users may submit environments to which they do not necessarily have real-world access during video game play. This allows for home users to adventure in local settings like parks or public venues, or other user's environments. Once users start submitting models for game environments there are immediate social possibilities. A group of friends (who perhaps have been to each other's homes in real life) may want to give permission to use their homes in other games played by others. This may become a social feature where people share maps with contacts for social network games (including the social networks within game services). When a home works particularly well for a given game, users may share such information with their friends, helping games to spread virally. One example of this may be a "capture the flag" type game where players each establish their home as the home base. If there are two teams around two gaming console systems, each team may defend the building they are in or buildings they are familiar with. Adjusting the scale, players may similarly have a "castle defense" type game where tiny armies try to invade from one room or house to another.

Figure 2:
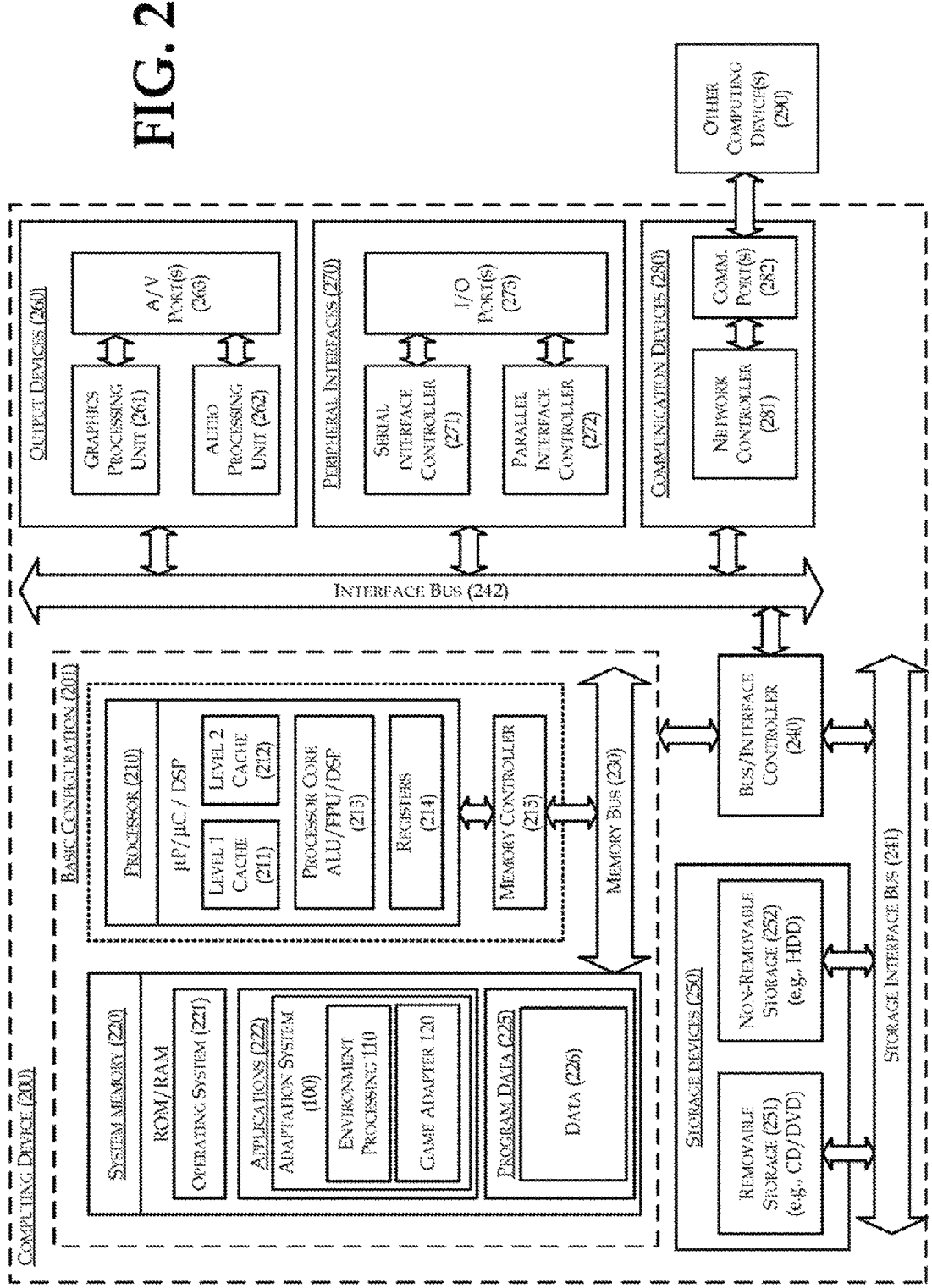
FIG. 2 is a block diagram of a computing device as one example of a device providing an adaptation system for adapting video games to received environment inputs.

FIG. 2 is a block diagram of a computing device 200 as one example of a device providing an adaptation system for adapting video games to received environment inputs, arranged in accordance with at least some embodiments of the present disclosure. In a very basic configuration 201, computing device 200 may include one or more processors 210 and system memory 220. A memory bus 230 may be used for communicating between the processor 210 and the system memory 220.

Depending on the desired configuration, processor 210 may be of any type including but not limited to a microprocessor (μP), a microcontroller (μC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225. In some embodiments, operating system 221 may comprise a virtual machine that is managed by a Virtual Machine Manager (VMM). Applications 222 may include, for example, adaptation system 100, comprising environment processing module(s) 110 and/or game adapter module(s) 120. Program data 225 may include data 226 such as environment input 101 and/or 102, location graph 103, user parameters 104, video game parameters 105, preexisting location graphs 132, content library 131, and/or adapted video game 141 or 142 that may be used or generated by adaptation system 100.

In some embodiments, computing device 200 may provide environment processing module(s) 110 and not game adapter module(s) 120. For example, computing device 200 may comprise an environment input processing device adapted to receive environment inputs and generate location graphs. The environment input processing device may provide generated location graphs to another computing device, e.g., a game adapter device configured similar to computing device 200 and adapted to provide game adapter module(s) 120. Alternatively, the environment input processing device may be adapted to provide generated location graphs to a user of the environment input processing device, e.g., a user connecting to computing device 200 from another computing device 290, and the user may then provide generated location graphs to the game adapter device.

In some embodiments, computing device 200 may provide game adapter module(s) 120 and not environment processing module(s) 110. For example, computing device 200 may comprise the game adapter device described above. The game adapter device may be adapted to receive generated location graphs from a user device or from an environment input processing device, and to output adapted video games to either a video game server, from which the user may play the adapted video game, or to the user device, from which the user may also play the adapted video game.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 211, level 2 cache 212, system memory 220, removable storage 251, and non-removable storage devices 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of computing device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a server configured to provide custom adapted video games which are adapted to received environment inputs. Computing device 200 may also be implemented as a server configured to provide an environment input processing service, or a game adapter service which may interact with user devices and/or other servers to provide adapted video games. Computing device 200 may also be implemented as a personal or business use computer including laptop, desktop, video game console, or mobile device configurations, which computer may be configured to provide location graph adapted video games according to any of the various methods disclosed herein.

Figure 3:
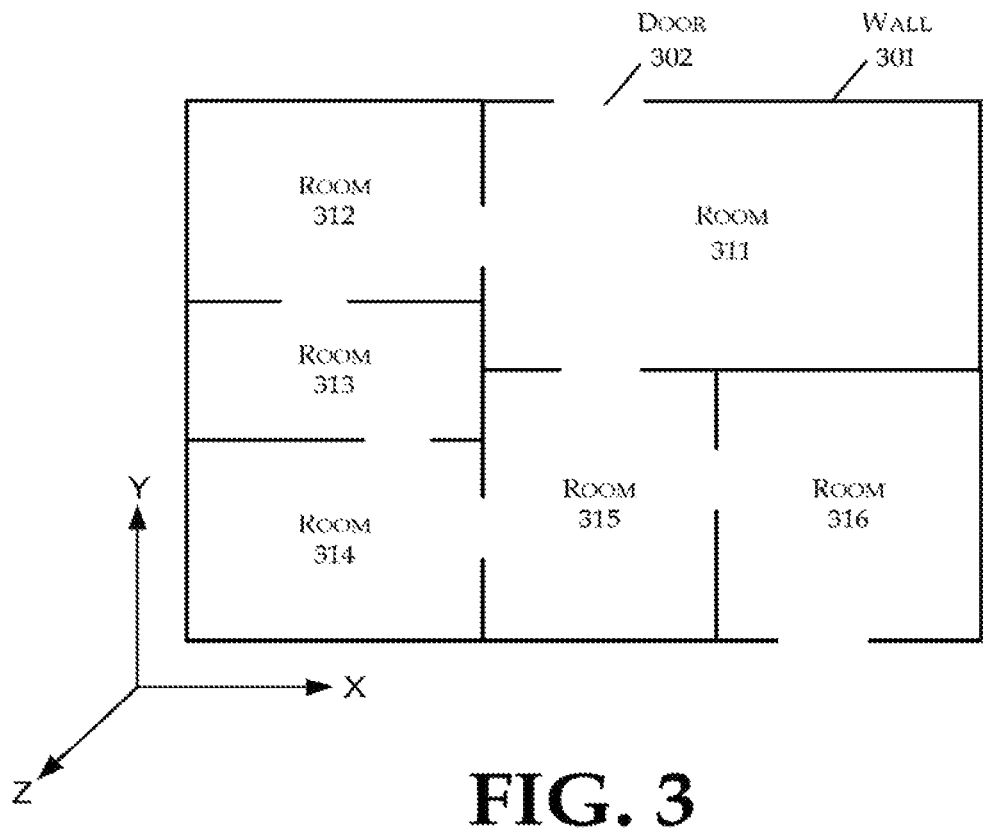
FIG. 3 is a diagram illustrating an example environment input.

FIG. 3 is a diagram illustrating an example environment input, arranged in accordance with at least some embodiments of the present disclosure. Environment inputs may be implemented as digital files or data structures defining dimensions and/or other properties of environments. The example environment input of FIG. 3 comprises multidimensional environment information, such as a 2D or 3D model of rooms of a house, office, building, or other structure. The environment input comprises a room 311, a room 312, a room 313, a room 314, a room 315, and a room 316, each of the rooms 311-316 having room dimensions, a room location relative to other rooms, and other properties such as doors into other rooms and/or doors leading out of the environment. The various rooms may be defined by walls such as wall 301 and doors such as door 302. The environment input may comprise a 3D model by including information defined by a 3D coordinate system such as the illustrated X, Y, and Z coordinates, or the environment input may comprise a 2D model by including information defined by a 2D coordinate system such as the illustrated X and Y coordinates.

In some embodiments, environment inputs may include multi-level inputs, such as for a multi-story home. In some embodiments, environment inputs may include information about ceiling height, windows, fixtures and furniture, lights, artwork or other décor, or any other information that may usefully describe an environment.

In some embodiments, environment inputs such as illustrated in FIG. 3 may be generated from environment scans. Environment scans may comprise images adapted for constructing 3D models of environments. For example, some environment scans may comprise video captured as a person walks through an environment. A high quality environment scan may comprise video captured within each room in an environment, the captured video comprising, for example, video from a 360 degree rotation within each room, video from an upward rotation to capture ceiling properties within each room, video from a downward rotation to capture floor properties within each room, and/or video showing travel to a next room in the environment. A lower quality environment scan may comprise digital photographs captured within each room of an environment. It will be appreciated that with appropriate image processing, environment scans including sufficient environment information may be converted into 2D or 3D models of environments with varying degrees of accuracy. In some embodiments, objects in the home, workplace or other environment input may be recognized by video extraction and recognition systems, and such information can optionally be added at nodes in the location graphs described herein, used to subdivide location graphs into smaller area sub-graphs, and/or used in environment models deployed within adapted video games as described herein.

Figure 4:
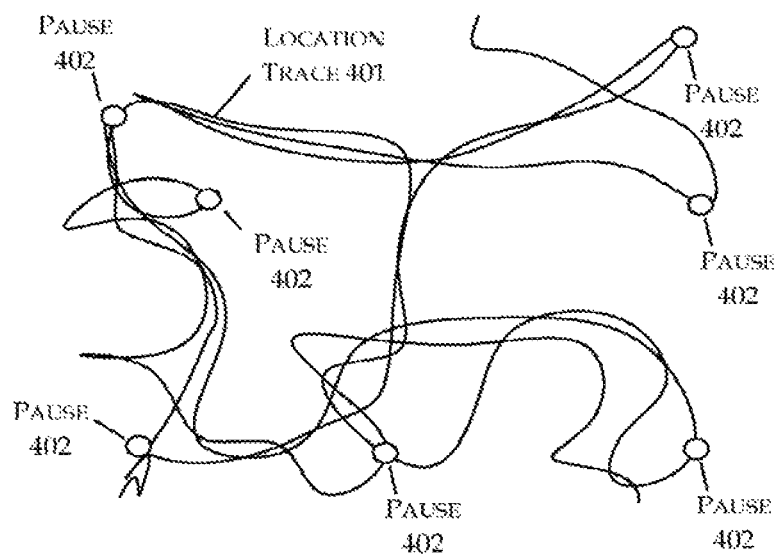
FIG. 4 is a diagram illustrating an example environment input.

FIG. 4 is a diagram illustrating another example environment input, arranged in accordance with at least some embodiments of the present disclosure. Environment inputs may be implemented as digital files or data structures defining location trace data and/or motion data, defining movements of objects within an environment. The example environment input of FIG. 4 comprises multidimensional environment information, such as a location trace 401 showing positions of a person as they walk around within a structure or other environment.

In some embodiments, location trace 401 may include time variable information, such as speed of the person moving through the environment, in addition to position variable information. For example, FIG. 4 includes pause points 402 along location trace 401. Pause points 402 may comprise, e.g., points at which the person paused for at least some threshold period of time, such as by pausing for 3 seconds or any other threshold period of time. In some embodiments, location trace 401 may include motion as well as position information. For example, motions such as sitting, standing up, lying down, rocking, lifting, etc. may or may not include changing position, but may nonetheless be included with location trace data as motion or activity information.

In some embodiments, location trace 401 and/or motion/inertial data may be used to identify items or aspects of environments that cannot be recognized from environment scans alone, such as the uses of specific areas. Human-activity recognition systems have been developed which use accelerometers to identify when a human is engaged in different physical activities. Activity recognition systems may use, e.g., data from one or more three axis accelerometers. Data from the accelerometers may be processed to create a vector composed of autoregressive coefficients, Signal-Magnitude Area ("SMA"), and Tilt Angle ("TA") data. The vector may then be used to recognize what activity a user was engaged in. Activity recognition systems may recognize a range of physical activities such as sitting, standing, sit-stand and stand-sit transitions, walking upstairs and downstairs, lying, walking, running, hammering, sawing, filing, drilling, sanding, and grinding. In some embodiments, such data may be integrated with qualitative information for various nodes of a generated location graph to help a game classify areas within the user's environment and fit appropriate content. For example, activity recognition data may be used to identify sleeping or eating spaces and avoiding certain imagery there. In some embodiments, activity recognition data may provide serious work games with helpful information to match content, for example a procedurally generated work game may use activity recognition data to determine locations related to various activities and then integrate appropriate safety or action training, without needing expensive manual customization of the content.

By combining activity recognition data with location data available through GPS or non-GPS methods, embodiments may associate a location or object with specific user activities that can be added to relevant nodes in a location graph for the environment input. This may allow object recognition such as by identifying chairs, beds, couches and many other household objects, which can be variable in appearance and hard for video-based recognition systems to classify. For example, a chair may be identified by a large probability over time that a user reaches the location by stand-sit transitions, sits in the location for a time, and then leaves the location by sit-stand transitions. This can be used to place a seating animation in the game and to classify the location for various activities such as writing, using maps, crafting, or similar activities that take place while seated. In a more complicated example a "dining table" may be judged as the place(s) likely to be sat at after time spent standing and using appliances in the kitchen. Both the activities at locations and activity based object recognition can be applied to make game content more appropriate and a better match for user environments.

If an environment is categorized down to the level of chairs, appliances, and/or tools, game content can be finely adapted. For example, location graphs may comprise subgraphs within each room so that a room known to be a kitchen includes chairs and identified appliances to allow for better animation and character use of items in the user environment. In a workspace such identifications can be used to procedurally customize training. A work game deployed on employee phones may for example record inertial data of experienced users, and use the inertial data to track work patterns of newer users to determine who may need training.

Location trace 401 may comprise 2D or 3D position information. For 2D information, position of the person (or other object such as a robot) may be traced in a 2D coordinate system such as the X and Y coordinates in FIG. 3. For 3D information, position of the person may be traced in a 3D coordinate system such as the X, Y, and Z coordinates in FIG. 3, e.g. by using a mobile device accelerometer to trace position in 3D, or by using a GPS in combination with an altimeter to trace position in 3D.

In some embodiments, environment inputs may comprise combinations of location trace data, such as illustrated in FIG. 4, with 2D or 3D models or with environment scans, such described in connection with FIG. 3.

Figure 5:
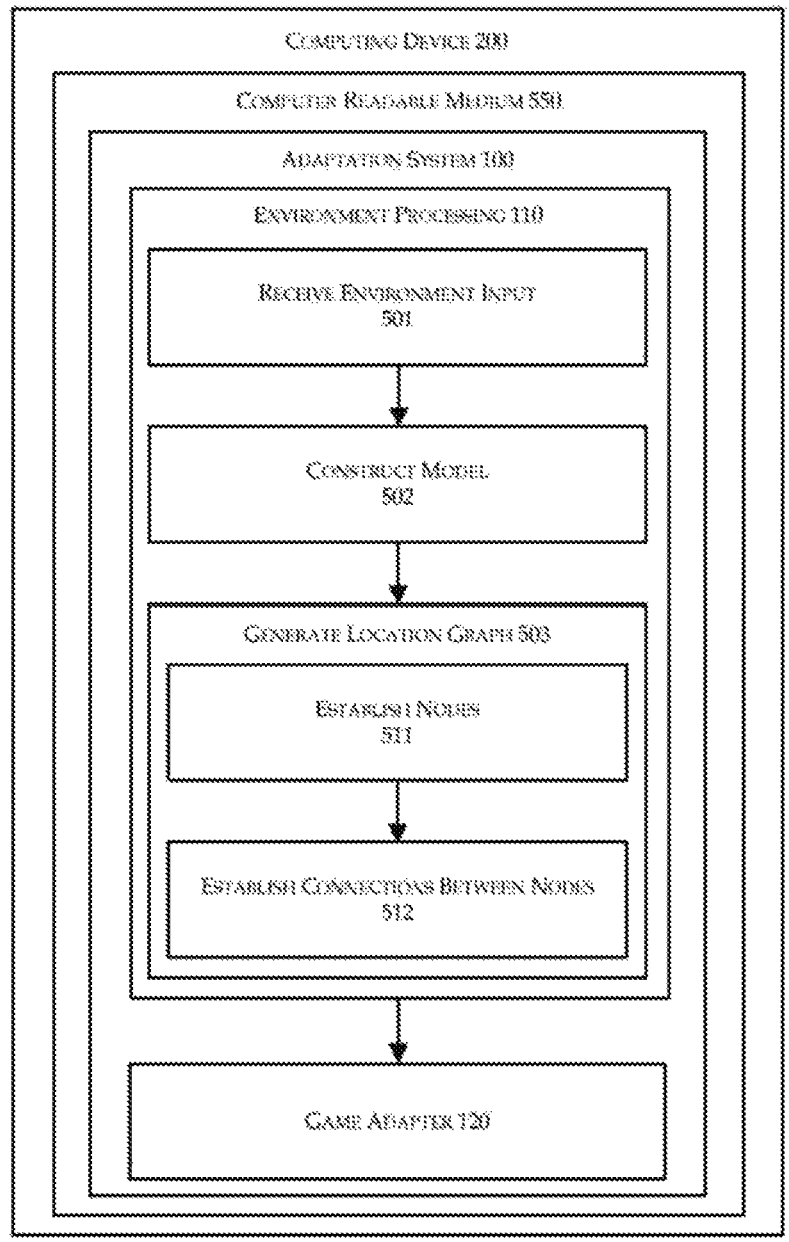
FIG. 5 is a flow diagram illustrating example methods configured to generate location graphs of received environment inputs.

FIG. 5 is a flow diagram illustrating example methods configured to generate location graphs of received environment inputs, arranged in accordance with at least some embodiments of the present disclosure. The example flow diagram may include one or more operations/modules as illustrated by blocks 100, 110, 501, 502, 503, 511, 512, and 120, which represent operations as may be performed in a method, functional modules in a computing device 200, and/or instructions as may be recorded on a computer readable medium 550.

In FIG. 5, block 100 comprises blocks 110 and 120, which are illustrated as being performed sequentially, block 110 includes blocks 501, 502, and 503, which are illustrated as being performed sequentially, and block 503 includes blocks 511 and 512, which are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

Figure 6:
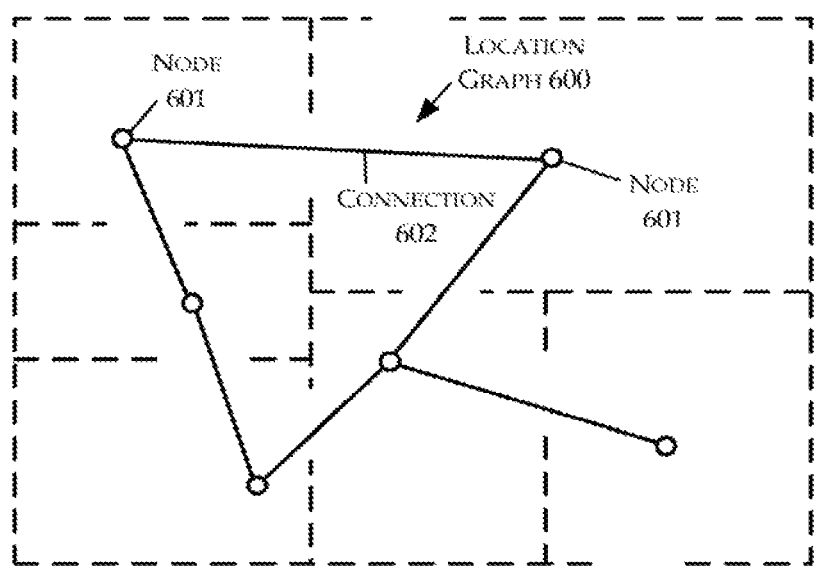
FIG. 6 is a diagram illustrating an example location graph comprising nodes and connections between the nodes.

FIG. 5 illustrates example methods by which computing device 200 equipped with adaptation system 100 comprising environment processing module(s) 110 may generate location graphs from received environment inputs. An example location graph output of environment processing module(s) 110 is illustrated in FIG. 6. Environment processing module(s) 110 may be configured to provide location graphs to game adapter 120, and game adapter 120 may adapt a video game to a generated location graph, as described in connection with FIG. 7 and/or FIG. 8.

In some embodiments, environment processing module(s) 110 may be optionally configured to generate a model, e.g., a 2D or a 3D model of a received environment input, as well as a location graph. Generated models may be used in adapted video games comprising a traditional gaming experience in which users sit or stand in front of a display, such as a television, and play the adapted game. For adapted video games that provide an AR gaming experience in which video game content is inserted into live video as users move around their environments, generating models of received environment inputs may be unnecessary.

At a "Receive Environment Input" block 501, computing device 200 may receive an environment input. Environment inputs may take a variety of different forms, and may generally comprise digital files including data that describes multidimensional environment information. Example environment inputs include 2D and 3D models, environment scans, and location traces.

In some embodiments, block 501 may comprise providing, by computing device 200, an environment processing User Interface (UI) adapted for user selection of an environment input. The environment processing UI may for example prompt the user to select one or more environment input files stored in a memory location accessible by computing device 200, the selected environment input files comprising a desired environment input selection. In response to receiving an environment input selection, block 501 may load the selected environment input files and may optionally determine whether the files are in a format that can be processed by blocks 502 and 503. Block 501 may be followed by block 502.

At a "Construct Model" block 502, computing device 200 may optionally construct a 2D or 3D model of the received environment input. For example, when the received environment input comprises an environment scan comprising images adapted for constructing a 3D model of an environment, block 502 may construct the 3D model of the environment by applying systematic image processing techniques on the environment scan. Block 502 may use image recognition on the images of the environment scan to identify room dimensions and/or doorways, as well as to determine spatial relationships between different rooms. GPS and/or accelerometer data linked to image data of an environment scan may also be used to determine spatial relationships between different rooms. Block 502 may for example use 3D modeling technologies such as those made by MATTERPORT® in Mountain View, Calif. and the 123D Catch app made by AUTODESK® in San Rafael, Calif.

In some embodiments, block 502 may also use image recognition on the images of the environment scan to identify objects within the environment, such as tables, chairs, beds, trees, paintings or other art hanging on walls, appliances, workstations, etc. In some embodiments, block 502 may be adapted to construct models from any of a variety of different environment input types, including for example motion data which may optionally be combined with image recognition data. Models constructed at block 502 may be stored for use by blocks 503 and/or 120. Block 502 may be followed by block 503.

In some embodiments, the environment input received at block 501 may comprise data that is appropriate "as-is" for use by blocks 503 and 120, in which case block 502 may be omitted. In some embodiments, the environment input received at block 501 may be processed at block 502 without necessarily generating a model of an environment. For example, block 502 may process the received environment input by converting it to another format, adding descriptive data, or enhancing features of the received environment input, so that features of the received environment input are recognizable for the purpose of generating a location graph at block 503. In some embodiments, block 502 may comprise a user-interactive process, so that the user may correct or otherwise modify a model of an environment generated from the received environment input.

At a "Generate Location Graph" block 503, computing device 200 may generate a location graph representing the received environment input. The location graph may be generated using the environment input as received at block 501, or from the model constructed at block 502. The location graph may comprise nodes corresponding to locations within the received environment input, and connections between the nodes corresponding to pathways between the locations within the received environment input. For example, a location graph may comprise nodes corresponding to rooms within a building described by the received environment input, and connections between the nodes corresponding to pathways provided by doors between the rooms within the received environment input. Block 503 may include blocks 511 and 512. FIG. 6 is used to describe operations of blocks 511 and 512, and so FIG. 6 is briefly introduced below.

FIG. 6 is a diagram illustrating an example location graph comprising nodes and connections between the nodes, arranged in accordance with at least some embodiments of the present disclosure. FIG. 6 illustrates a location graph 600 for the environment input illustrated in FIG. 3. In some embodiments, location graphs may be in the form of a file or data structure comprising node position and connection information, optionally in combination with any other information that may be included along with a location graph, such as information mapping a location graph to an environment, user parameters associated with nodes, or other information. Nodes 601 may be placed in positions corresponding to locations within the received environment input, e.g., nodes 601 are placed in positions corresponding to each of rooms 311-316 in the received environment input of FIG. 3. Connections such as 602 are placed between nodes 601, the connections 602 corresponding to pathways between the locations (in this case, the doorways between rooms 311-316) within the received environment input.

Returning to FIG. 5, at an "Establish Nodes" block 511, computing device 200 may establish nodes for a location graph, the nodes corresponding to locations within the received environment input. Nodes may be established by identifying locations of any desired location type within the received environment input. In some embodiments, a location type may comprise rooms in a building. For example, nodes 601 may be placed within each of rooms 311-316 in the received environment input of FIG. 3. In other embodiments, location types may comprise, e.g., outdoor landscape features such as clearings in a forest, spaces bounded by large furniture within a room, or spaces such as underneath tables or chairs. Block 511 may be followed by block 512.

At an "Establish Connections Between Nodes" block 512, computing device 200 may establish connections between the nodes established at block 511. Block 512 may establish connections corresponding to pathways between the locations within the received environment input. For example, in some embodiments, block 512 may establish connections between any nodes that are not separated by a boundary, such as a wall, or by a location occupied by another node. FIG. 6 illustrates connections such as 602 between nodes 601, wherein the connections 602 correspond to doorways between rooms 311-316 within the environment input of FIG. 3. Other pathways such as windows, gaps between large furniture items defining a location occupied by a node, or gaps between rocks or trees in an outdoor environment may also be established as pathways in some embodiments.

In some embodiments, blocks 511 and/or 512 may comprise a user-interactive process. For example, computing device 200 may display a location graph editor UI comprising a model of the environment input. The location graph editor UI may be adapted to allow user creation and/or modification of nodes and connections between nodes. In another example, generating a location graph representing a received environment input may comprise displaying an automatically generated location graph in a UI adapted for editing the location graph, and applying any location graph modifications received via the UI.

Once nodes and connections are established at blocks 511 and 512, respectively, block 503 may save the generated location graph for use in adapting video games to the generated location graph. In some embodiments, block 503 may provide the generated location graph directly to block 120, and block 120 may automatically begin adapting a video game to the generated location graph. In some embodiments, block 503 may provide the generated location graph to the user for use in subsequent user interactions to initiate adapting a video game to the generated location graph. In some embodiments, block 503 may store the generated location graph in a location graph store. Users may set sharing permissions to share their generated location graphs with other users via a network. Game adapters such as 120 for each of multiple different video games may access the location graph store to adapt any of the different video games to generated location graphs.

In embodiments supporting user sharing of location graphs and/or corresponding adapted game environments, adaptation systems may be configured to remove certain items or imagery from environment inputs. For example, removing valuables or placing phony valuables in all locations such that users assume valuables are fake may reduce the possibility of crimes inspired by a view of shared environments. Adaptation systems may, for example, build a library of room walls and surfaces from a large collection of submitted environments and replace the walls and surface contents of any models shared with others for safety and privacy.

As an additional feature, adaptation systems may perform face recognition or recognize wall frames and replace any art or pictures with game-related or random imagery. This may add to the fun of the game as a user adventures in their own house and sees, e.g., family pictures replaced with images related to the game. If such measures encourage environment sharing, a game may build up a collection of usable locations based on environment inputs from multiple different users. As in any crowd-sourcing scenarios, adaptation systems may provide for user flagging of inappropriate content to prevent users from uploading offensive or otherwise inappropriate content.

Figure 7:
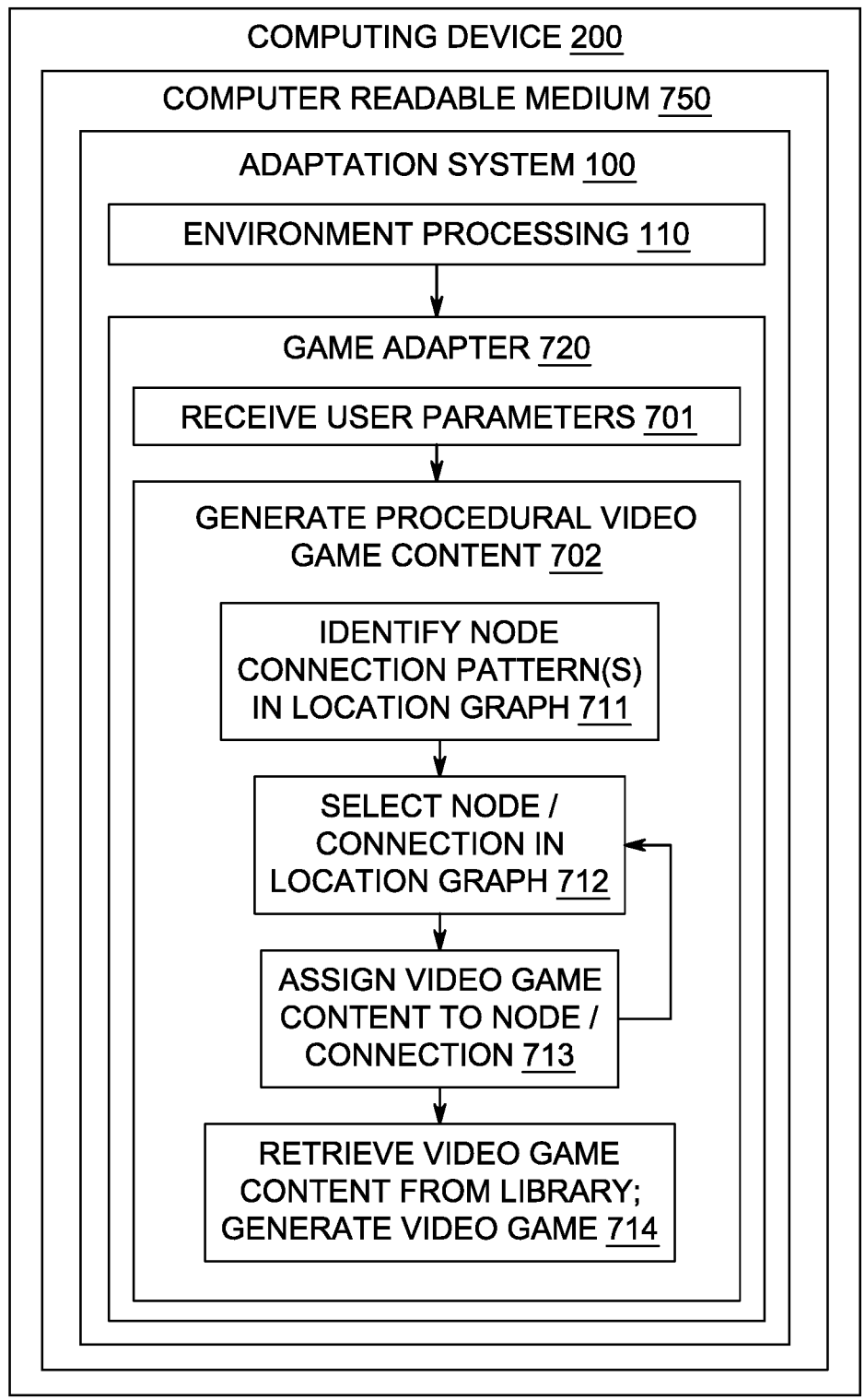
FIG. 7 is a flow diagram illustrating example methods configured to adapt video games to location graphs by generating procedural video game content.

FIG. 7 is a flow diagram illustrating example methods configured to adapt video games to location graphs by generating procedural video game content, arranged in accordance with at least some embodiments of the present disclosure. The example flow diagram may include one or more operations/modules as illustrated by blocks 100, 110, 720, 701, 702, 711, 712, 713, and 714, which represent operations as may be performed in a method, functional modules in a computing device 200, and/or instructions as may be recorded on a computer readable medium 750.

In FIG. 7, block 100 comprises blocks 110 and 720, which are illustrated as being performed sequentially, block 720 includes blocks 701 and 702, which are illustrated as being performed sequentially, and block 702 includes blocks 711-714, which are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 7 illustrates example methods by which computing device 200 equipped with adaptation system 100 comprising a game adapter 720 may adapt video games to location graphs of received environment inputs, such as location graphs generated by environment processing module(s) 110. Game adapter 720 comprises an embodiment of game adapter 120, wherein game adapter 720 is configured to operate by generating procedural video game content. Game adapter 120 may be arranged as game adapter 720 in some embodiments, or game adapter 120 may be arranged as a game adapter 820 described in FIG. 8, or game adapter 120 may be arranged to include functions of game adapter 720 as well as functions of game adapter 820.

Game adapter 720 may be configured to operate by generating procedural video game content using a library of video game content and a location graph generated by block 110, at least in part by placing video game content from the library at nodes in the location graph corresponding to locations within the received environment input, as described in detail herein. Game adapter 720 may initially receive a location graph either directly from environment processing module(s) 110, or for example via a location graph selection UI. The location graph selection UI may for example prompt the user to select a location graph corresponding to an environment input, wherein the selected location graph may be stored in a memory location accessible by computing device 200. In response to receiving a location graph selection, block 720 may load the selected location graph file and may initiate video game adaptation processing with block 701 or 702.

At a "Receive User Parameters" block 701, computing device 200 may optionally receive any user parameters for the environment corresponding to the location graph. For example, in some embodiments block 701 may display a user parameter UI, allowing user selection of user parameters for the various environment locations/nodes of the location graph. Example user parameters may include: out of bounds parameters marking locations within the environment/nodes of the location graph as unavailable for use in the video game; time of use parameters marking locations within the environment/nodes of the location graph as available for use in the video game or unavailable for use in the video game during specified times; and/or content type parameters designating an allowed or a disallowed video game content type within locations within the environment/nodes of the location graph. Computing device 200 may receive these or any other user parameters for adapting the video game to the location graph, e.g., via selections from the user parameter UI; and computing device 200 may apply received user parameters when adapting the video game to the location graph at block 702.

Some embodiments may omit block 701 and may optionally not account for user parameters when adapting video games. Some embodiments may include block 701 in environment processing module(s) 110, which embodiments may allow for storing user parameters along with location graphs, and application of stored user parameters in connection with adapting multiple different video games, e.g., by game adapters associated with each of the different video games. In embodiments including block 701 in game adapter 720, block 701 may be followed by block 702.

At a "Generate Procedural Video Game Content" block 702, computing device 200 may place video game content from content library 131 at nodes in the location graph corresponding to locations within the received environment input. Block 702 may generally be adapted to make video game content selections and to make content placement determinations. For example, in some embodiments, block 702 may randomly select video game content and block 702 may randomly select nodes in the location graph for placement of the selected video game content. In some embodiments, block 702 may apply any combination of user and/or video game parameters in content selection and placement.

Procedural content is generally content that is algorithmically developed using rules such as random content selection rules, non-random content selection rules as may be implemented through video game parameters supplied by the game developer, and/or or user parameters, as discussed herein. In some embodiments, block 702 may custom generate procedural content for received environment inputs. In some embodiments, block 702 may employ multiple subgraphs, with different topologies which may be connected together to form hybrid topologies. Block 702 may generate procedural content of any desired scale including, for example, procedural content that includes the user environment as a sub-environment within a broader environment of a video game.

Block 702 may include blocks 711-714, wherein blocks 711-713 provide example operations as may be performed in connection with content selection and placement determinations, and block 714 provides example operations in connection with generating an adapted video game according to content selection and placement determinations.

At an "Identify Node Connection Pattern(s) in Location Graph" block 711, computing device 200 may identify connection patterns in the location graph. For example, location graph 600 exhibits a loop comprising 5 nodes. There are no cross-connections between the nodes in the loop. Also, one of the nodes connects to a single additional node, which additional node is not connected to any other nodes. Any pattern types and/or numbers of nodes may be identified at block 711, to identify patterns that may be useful in connection with generating procedural content. For example, some video games may comprise content that is appropriate for loops, content that is appropriate for nodes in series, content that is appropriate for nodes that are connected to only one other node, etc. Video game parameters may define, inter alia, such placement parameters for video game content.

In some embodiments, block 711 may check user parameters for any nodes that may be marked as out of bounds and/or unavailable pursuant to time of use parameters, prior to identifying connection patterns in the location graph. Block 711 may be followed by block 712.

At a "Select Node/Connection in Location Graph" block 712, computing device 200 may select a node or connection in the location graph. The selected node or connection may comprise, e.g., a first node or connection in a first connection pattern identified in the location graph at block 711. After video game content is assigned to the first node/connection at block 713, block 712 may select a next node or connection in the first connection pattern, and so on until all nodes in the first connection pattern are processed. Block 712 may next select a first node, next node, etc. in a second connection pattern or any further connection patterns, until all nodes in all identified connection patterns are processed. Block 712 may be followed by block 713.

At an "Assign Video Game Content to Node/Connection" block 713, computing device 200 may assign video game content to the node or connection selected at block 712. Assigning video game content may account for any user parameters and/or video game parameters applicable to the node or connection. For example, any content type parameters may limit the set of available video game content that may be applied to a node. Any video game parameters controlling content available for a connection pattern as identified at block 711, or video game parameters controlling content available for individual nodes within an identified connection pattern, may further limit the set of available video game content that may be applied to a node.

Video game content assigned at block 713 may comprise any video game content, and this disclosure is not limited to any particular type of content. For example, content may comprise characters such as monsters or other "bad guys", and/or friends, helpers, trainers, or other "good guys" with which the player interacts. Content may comprise objects such as tools, books, weapons, clothing, etc. Content may comprise short video segments such as workplace training videos, or storyline videos to set context for fantasy games. In some embodiments, content may comprise artwork, appliances, or other video game objects that replace or modify objects recognized within the environment input, e.g., as described in connection with block 502.

Block 713 may be followed by block 712 when there are additional remaining nodes or connections for which video game content is not assigned, or which are not marked by block 713 as done. Block 713 may be followed by block 714 when all nodes in the location graph have assigned video game content or are otherwise marked as done at block 713.

At a "Retrieve Video Game Content From Library; Generate Video Game" block 714, computing device 200 may generate an adapted video game according to the content selection and placement determinations from blocks 712-713. For example, to provide a traditional gaming experience, block 714 may retrieve, from content library 131, video game content assigned to each node or connection of the location graph, and block 714 may place the retrieved video game content within a 3D model, e.g., the model constructed at block 502, at the nodes/locations to which the content was assigned at block 713. To provide an AR gaming experience, block 714 may retrieve, from content library 131, video game content assigned to a node or connection of the location graph in response to location and/or orientation input indication a user position at the node or connection. The adapted video game may thereby be configured as an AR video game in which video game content is encountered within the video game as a user physically changes position and/or orientation within the environment corresponding to the environment input.

Figure 8:
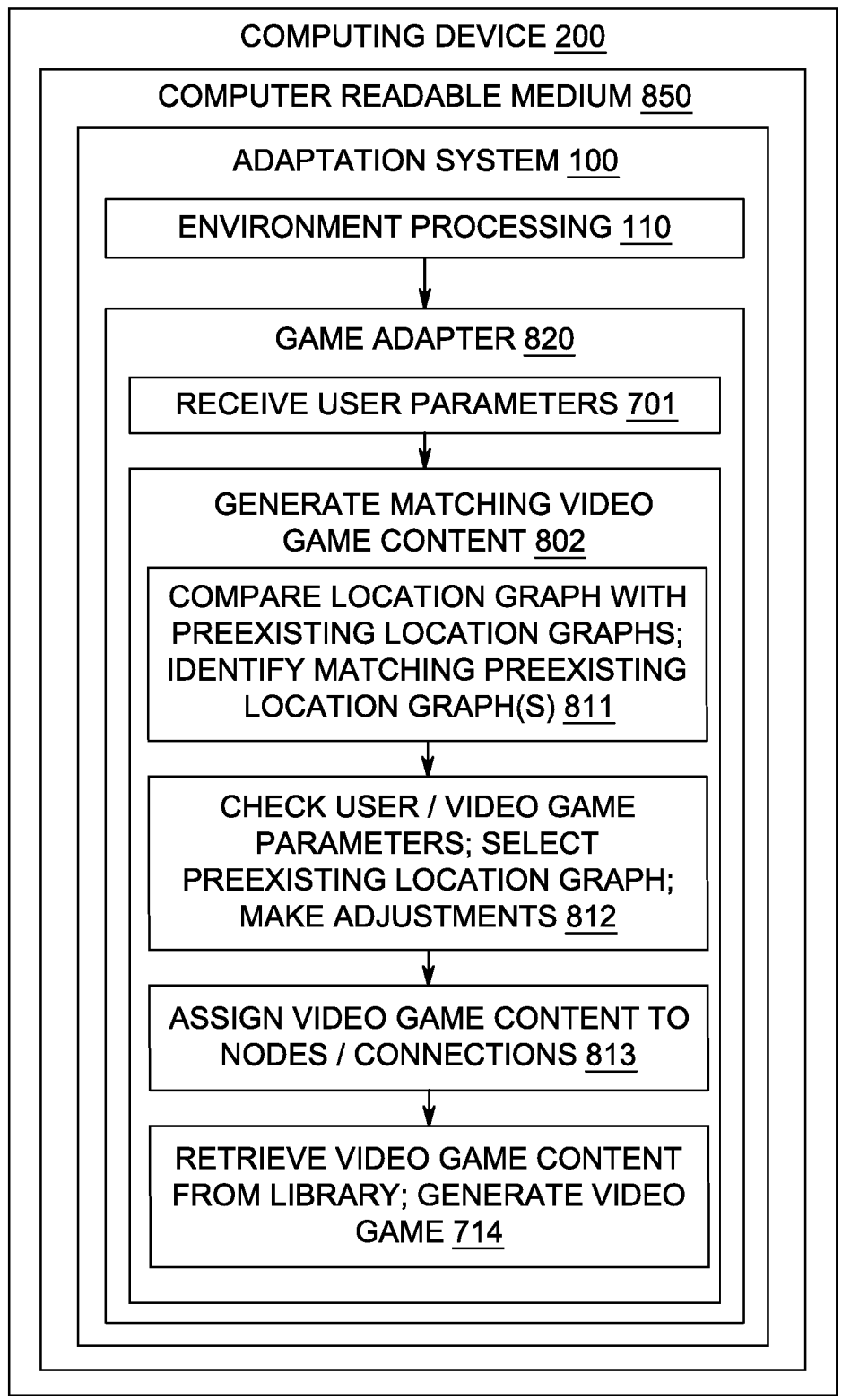
FIG. 8 is a flow diagram illustrating example methods configured to adapt video games to location graphs by matching location graphs with preexisting video game location graphs, all arranged in accordance with at least some embodiments of the present disclosure.

FIG. 8 is a flow diagram illustrating example methods configured to adapt video games to location graphs by matching location graphs with preexisting video game location graphs, arranged in accordance with at least some embodiments of the present disclosure. The example flow diagram may include one or more operations/modules as illustrated by blocks 100, 110, 820, 701, 802, 811, 812, 813, and 714, which represent operations as may be performed in a method, functional modules in a computing device 200, and/or instructions as may be recorded on a computer readable medium 850.

In FIG. 8, block 100 comprises blocks 110 and 820, which are illustrated as being performed sequentially, block 820 includes blocks 701 and 802, which are illustrated as being performed sequentially, and block 802 includes blocks 811-813 and 714, which are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 8 illustrates example methods by which computing device 200 equipped with adaptation system 100 comprising a game adapter 820 may adapt video games to location graphs of received environment inputs, such as location graphs generated by environment processing module(s) 110. Game adapter 820 comprises an embodiment of game adapter 120, wherein game adapter 820 is configured to operate by matching the location graph representing the received environment input with a preexisting video game location graph, also referred to herein as a matching location graph, so that video game content associated with the preexisting location graph can be applied in the environment of the adapted video game. As noted herein, game adapter 120 may be arranged as game adapter 820 in some embodiments, or game adapter 120 may be arranged as game adapter 720 described in FIG. 7, or game adapter 120 may be arranged to include functions of game adapter 720 as well as functions of game adapter 820.

Game adapter 820 may be configured to operate by comparing a generated location graph with one or more preexisting location graphs to identify a matching preexisting location graph, identifying video game content associated with the matching preexisting location graph, retrieving the identified video game content from a library of video game content, and placing the retrieved video game content at nodes in the generated location graph corresponding to locations within the received environment input, as described in detail herein. As with game adapter 720, game adapter 820 may initially receive a generated location graph either directly from environment processing module(s) 110, or for example via a location graph selection UI. Block 820 may load the generated location graph file and may initiate video game adaptation processing with block 701 or 802.

At a "Receive User Parameters" block 701, computing device 200 may optionally receive any user parameters for the environment corresponding to the generated location graph, as described with reference to FIG. 7. In embodiments including block 701, block 701 may be followed by block 802.

At a "Generate Matching Video Game Content" block 802, computing device 200 may generally adapt a video game by applying, in an environment corresponding to a generated location graph, video game content from a video game environment having a matching or similar location graph. For example, a video game may comprise a variety of different space stations, each space station having crew member characters that may be encountered in various different rooms. Embodiments may be adapted to compare a generated location graph with preexisting video game location graphs for each of the different space stations to find a matching or best matching preexisting video game location graph. Video game content for a matching space station and crew member characters may then be, for example, applied within the environment of the generated location graph. Alternatively, aspects from the environment input or constructed model associated with the generated location graph may be inserted or otherwise combined with the portion of the video game associated with the matching location graph.

In some embodiments, video games may be adapted to incorporate user environment inputs as part of a larger video game. For example, the user's real home may become a particular environment in an expansive modern city environment, and the home may be used for many scenes but not as the only game environment. Games that use in-room AR applications may introduce characters or additional items into the user's environment as well. This entails finding a sub-graph within the greater game content that matches the user's available environment.

In some embodiments, the step of finding a matching video game sub-graph may comprise a complex graph operation, such as any approach to the so-called isomorphism problem in graph theory. One example approach may comprise encoding a path throughout a search graph (e.g., the generated location graph) using rules that generate the same code based on the same available path, and then encoding a target graph network (e.g., a graph network comprising a larger pre-existing location graph, a portion of which may match the generated location graph), and searching for one code within the other. Some embodiments may search for sub-graph isomorphism, rather than graph isomorphism. This may be defined such that given two graphs $G1=(N1, B1)$ and $G2=(N2, B2)$, a mapping $M \subset N'N$ is said to be an isomorphism if and only if it is a bijective function that preserves the branch structure of the two graphs. That is, M maps each branch of G1 onto a branch of G2 and vice versa. M is said to be a graph-subgraph isomorphism if and only if M is an isomorphism between G2 and a sub-graph of G1.

Another example approach may comprise using an isomorphism search method called VF2 as described in Cordella, "An Improved Algorithm for Matching Large Graphs," 2001. VF2 methods may be suitable to finding multiple potential matching location graphs and generating a mapping list of nodes from the user environment to nodes in the overall game content. Example VF2 algorithms may be coded to use arrays of hashed node names and edges, implemented for example using Python dict structures, to match location graphs. In some embodiments, VF2 algorithms designed for directed graphs may be modified with programming to handle undirected graphs. Block 802 may include blocks 811-813 and 714.

At a "Compare Location Graph with Preexisting Location Graphs; Identify Matching Preexisting Location Graph(s)" block 811, computing device 200 may compare the generated location graph from block 110 with a library of preexisting location graphs, such as content library 131 in FIG. 1. Video games typically comprise multiple environments, such as buildings or outdoor environments comprising paths between different locations. Block 811 appreciates that location graphs may be made for each such environment included in a video game, and that computing device 200 may be adapted to compare the generated location graph with such preexisting location graphs as well as portions (sub-graphs) thereof. One or more of the preexisting location graphs may be identified as a matching location graph. An exact match may, but need not be required in all embodiments. Some embodiments may identify one or more best matches. Some embodiments may identify a set of close matches, such as matches having 75% similarity (or any other desired similarity threshold) or better.

In some embodiments, block 811 may check user parameters for any nodes that may be marked as out of bounds and/or unavailable pursuant to time of use parameters, prior to comparing the generated location graph with preexisting location graphs. Block 811 may be followed by block 812.

At a "Check User/Video Game Parameters; Select Preexisting Location Graph; Make Adjustments" block 812, computing device 200 may select a matching location graph from among the location graph(s) identified at block 811, and make adjustments. In some embodiments, block 812 may check user and video game parameters for each node of the generated or matching location graphs, to ensure that, e.g., the generated location graph and/or the environment input do not violate any video game parameters, and conversely, the video game content associated with the matching location graph does not violate any user parameters. A preexisting location graph having a fewest number of parameter violations may be selected.

In some embodiments, adjustments may be made to avoid remaining parameter violations, such as by removing video game content that violates user content type parameters, or moving such content to different nodes/locations. Adjustments may also insert barriers, such as locked doors, between nodes/locations from the generated location graph to eliminate connections that may violate video game parameters. Conversely, adjustments may insert connections, such as secret passageways or doors that do not actually exist in physical environments, to include connections as may be required to satisfy video game parameters. Such adjustments may be made in traditional video games by modifying environment inputs or constructed models, and such adjustments may be made in AR video games by establishing player movement rules or exceptions to player movement rules. In some embodiments, adjustments may be made to improve player experience, such as by spreading video game content among nodes in a generated location graph that may exceed nodes in a matching location graph, by eliminating content from unmatched nodes in an otherwise matching location graph, or by moving content from unmatched nodes in an otherwise matching location graph to other nodes in a generated location graph, e.g., to unmatched nodes from the generated location graph. Block 812 may be followed by block 813.

At an "Assign Video Game Content to Nodes/Connections" block 813, computing device 200 may assign video game content associated with each node or connection in the matching preexisting location graph, as adjusted at block 812, to the corresponding nodes or connections in the generated location graph. Block 813 may be followed by block 714.

At "Retrieve Video Game Content From Library; Generate Video Game" block 714, computing device 200 may generate an adapted video game according to the assignments from block 813. Block 714 is described above in connection with FIG. 7.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A method, comprising:
   generating, by a computer, a location graph that comprises at least:
      one or more nodes that correspond to locations within a particular environment, and
      one or more connections, between the one or more nodes, that correspond to pathways between the locations;
   retrieving, by the computer, video game content associated with a preexisting location graph in a video game, wherein the preexisting location graph matches with the generated location graph;
   receiving, by the computer, one or more user parameters; and
   generating, by the computer, based on the received one or more user parameters, an adapted video game, wherein generating the adapted video game includes assigning the retrieved video game content to the one or more nodes or the one or more connections of the generated location graph that corresponds to the particular environment, and
   wherein retrieving the video game content associated with the preexisting location graph eliminates a need to manually develop video game content for the particular environment.

2. The method of claim 1, wherein receiving the one or more user parameters comprises receiving one or more of:
   an out of bounds parameter that specifies one or more locations, within the particular environment, as unavailable for use in the generation of the adapted video game;
   a time of use parameter that specifies the one or more locations, within the particular environment as available or unavailable, during a specified time, for use in the generation of the adapted video game; and
   a content type parameter to designate allowed or disallowed video game content for the one or more locations within the particular environment.

3. The method of claim 1, further comprising:
receiving, by the computer, one or more video game parameters,
wherein generating the adapted video game includes generating, by the computer, the adapted video game further based on the received one or more video parameters.

4. The method of claim 1, wherein generating the location graph comprises generating the location graph using at least one of a cellular automata algorithm and a floor space measurement algorithm.

5. The method of claim 1, further comprising:
receiving, by the computer, an environment input that comprises at least multidimensional environmental information, wherein the locations within the particular environment correspond to locations within the received environment input.

6. The method of claim 5, wherein receiving the environment input comprises receiving an environment scan that comprises images of the particular environment.

7. The method of claim 6, further comprising:
constructing a three dimensional (3D) model of the particular environment from the images of the particular environment, wherein constructing the 3D model of the particular environment from the images of the particular environment comprises performing image recognition on the images of the particular environment to identify at least one of: room dimension, pathways, and objects within the particular environment.

8. The method of claim 5, wherein receiving the environment input comprises receiving data that corresponds to rooms in a building, wherein one or more locations within the received environment input comprises the rooms in the building, and wherein one or more pathways between the one or more locations comprise doorways between the rooms in the building.

9. The method of claim 1, wherein the particular environment includes an environment of a user, the method further comprising:
detecting, by the computer, activities of the user by using one or more accelerometers;
determining, by the computer, one or more locations, within the environment of the user, which correspond to the detected activities; and
generating, by the computer, the location graph that comprises at least the one or more nodes that correspond to the determined one or more locations within the environment of the user.

10. The method of claim 9, wherein detecting the activities of the user includes detecting two or more of: sitting, standing, sit-stand transitions, stand-sit transitions, walking upstairs, walking downstairs, lying, walking, running, hammering, sawing, filing, drilling, sanding, and grinding.

11. The method of claim 1, wherein generating the adapted video game includes generating an adapted video game that corresponds to one of: a workplace training environment, a home environment, and an office environment.

12. The method of claim 1, further comprising:
sharing, by the computer, the adapted video game with one or more authorized users.

13. A non-transitory computer-readable medium that stores executable instructions that, in response to execution, cause one or more processors to perform or control performance of operations that comprise:
generate a location graph that comprises at least:
one or more nodes that correspond to locations within a particular environment, and
one or more connections, between the one or more nodes, that correspond to pathways between the locations;
retrieve video game content associated with a preexisting location graph in a video game, wherein the preexisting location graph matches with the generated location graph;
identify one or more user parameters; and
generate, based on the identified one or more user parameters, an adapted video game, wherein generation of the adapted video game includes assignment of the retrieved video game content to the one or more nodes or the one or more connections of the generated location graph that corresponds to the particular environment, and
wherein retrieval of the video game content associated with the preexisting location graph eliminates a need to manually develop video game content for the particular environment.

14. The non-transitory computer readable storage medium of claim 13, wherein the identified one or more user parameters comprise one or more of:
an out of bounds parameter that specifies one or more locations, within the particular environment, as unavailable for use in the generation of the adapted video game;
a time of use parameter that specifies the one or more locations within the particular environment as available or unavailable, during a specified time, for use in the generation of the adapted video game; and
a content type parameter to designate allowed or disallowed video game content for the one or more locations within the particular environment.

15. The non-transitory computer-readable medium of claim 13, wherein the instructions, in response to execution, cause the one or more processors to perform or control performance of at least one operation that comprises:
identify one or more video game parameters; and
generate the adapted video game based on the identified one or more video game parameters.

16. The non-transitory computer readable storage medium of claim 13, wherein generation of the location graph comprises generation of the location graph by use of at least one of a cellular automata algorithm and a floor space measurement algorithm.

17. The non-transitory computer-readable medium of claim 13, wherein the instructions, in response to execution, cause the one or more processors to perform or control performance of at least one operation that comprises:
identify an environment input that comprises at least multidimensional environmental information, wherein the locations within the particular environment correspond to locations within the identified environment input.

18. The non-transitory computer readable storage medium of claim 17, wherein identification of the environment input comprises identification of data that corresponds to rooms in a building, wherein one or more of locations within the identified environment input comprises the rooms in the building, and wherein one or more pathways between the one or more locations comprise doorways between the rooms in the building.

19. The non-transitory computer readable storage medium of claim 13, wherein the particular environment includes an environment of a user, and wherein the instructions, in response to execution, cause the one or more processors to perform or control performance of operations that comprise:
  detect activities of the user by use of one or more accelerometers;
  determine one or more locations, within the environment of the user, which correspond to the detected activities; and
  generate the location graph that comprises at least the one or more nodes that correspond to the determined one or more locations within the environment of the user.

20. The non-transitory computer readable storage medium of claim 19, wherein the detected activities of the user include two or more of: sitting, standing, sit-stand transitions, stand-sit transitions, walking upstairs, walking downstairs, lying, walking, running, hammering, sawing, filing, drilling, sanding, and grinding.

21. A computer system, comprising:
  a processor;
  a memory operatively coupled to the processor; and
  an adaptation system to adapt video games that are stored in the memory and are executable by the processor, wherein the adaptation system is configured to:
    generate a location graph that comprises at least:
      one or more nodes that correspond to locations within a particular environment input, and
      one or more connections, between the one or more nodes, that correspond to pathways between the locations;
    retrieve video game content associated with a preexisting location graph in a video game, wherein the preexisting location graph matches with the generated location graph;
    receive at least one of: one or more user parameters and one or more video game parameters; and
    generate, based on the received at least one of: the one or more user parameters and the one or more video game parameters, an adapted video game, wherein generation of the adapted video includes assignment of the retrieved video game content to the one or more nodes or the one or more connections of the generated location graph that corresponds to the particular environment, and
    wherein retrieval of the video game content associated with the preexisting location graph eliminates a need to manually develop video game content for the particular environment.

22. The computer system of claim 21, wherein the received one or more user parameters comprise one or more of:
  an out of bounds parameter that specifies one or more locations, within the particular environment, as unavailable for use in the generation of the adapted video game;
  a time of use parameter that specifies the one or more locations, within the particular environment, as available or unavailable, during a specified time, for use in the generation of the adapted video game; and
  a content type parameter to designate allowed or disallowed video game content for the one or more locations within the particular environment.

23. The computer system of claim 21, wherein the adaptation system is configured to generate the location graph by a use of at least one of a cellular automata algorithm and a floor space measurement algorithm.

24. The computer system of claim 21, wherein the particular environment includes an environment of a user, and wherein the adaptation system is further configured to:
  detect activities of the user by a use of one or more accelerometers;
  determine one or more locations, within the environment of the user, which correspond to the detected activities; and
  generate the location graph that comprises at least the one or more nodes that correspond to the determined one or more locations within the environment of the user.

25. The computer system of claim 24, wherein the adaptation system is configured to employ graph isomorphism to map the environment of the user to the video game content in order to determine a particular location in the video game that corresponds to a particular location within the environment of the user.

* * * * *